United States Patent
Güntner et al.

(10) Patent No.: US 10,081,848 B2
(45) Date of Patent: Sep. 25, 2018

(54) METHOD AND PLANT FOR REMOVING ARSENIC AND/OR ANTIMONY FROM FLUE DUSTS

(71) Applicant: Outotec (Finland) Oy, Espoo (FI)

(72) Inventors: Jochen Güntner, Kahl (DE); Peter Sturm, Karben (DE); Maciej Wrobel, Karben (DE); Jörg Hammerschmidt, Erlensee (DE); Ake Holmström, Katthammarsvik (SE); Gunnar Berg, Skelleftea (SE)

(73) Assignee: Outotec (Finland) Oy, Espoo (FI)

( * ) Notice: Subject to any disclaimer, the term of this patent is extended or adjusted under 35 U.S.C. 154(b) by 11 days.

(21) Appl. No.: 15/025,991

(22) PCT Filed: Oct. 2, 2013

(86) PCT No.: PCT/EP2013/070585
§ 371 (c)(1),
(2) Date: Mar. 30, 2016

(87) PCT Pub. No.: WO2015/048996
PCT Pub. Date: Apr. 9, 2015

(65) Prior Publication Data
US 2016/0237523 A1    Aug. 18, 2016

(51) Int. Cl.
*C22B 7/02* (2006.01)
*B01D 53/76* (2006.01)
(Continued)

(52) U.S. Cl.
CPC ............. *C22B 7/02* (2013.01); *B01D 53/64* (2013.01); *B01D 53/76* (2013.01); *B01D 53/83* (2013.01);
(Continued)

(58) Field of Classification Search
None
See application file for complete search history.

(56) References Cited

U.S. PATENT DOCUMENTS 3,427,149 A * 2/1969 Schwarz ................. C22B 1/02
423/148
3,776,533 A  12/1973 Vlnaty
(Continued)

FOREIGN PATENT DOCUMENTS

AU    2012306934 A1    8/2013
CN    101048519 A    10/2007
(Continued)

OTHER PUBLICATIONS

Notification of the First Chinese Office Action prepared by the State Intellectual Property Office of the People's Republic of China for CN 201380080025.0, dated Dec. 7, 2016, 19 pages.
(Continued)

*Primary Examiner* — Sheng H Davis
(74) *Attorney, Agent, or Firm* — Chernoff Vilhauer LLP

(57) ABSTRACT

A method for the treatment of flue dusts containing arsenic and/or antimony from pyrometallurgical methods, wherein a reducing agent is added to the flue dusts, the flue dusts are heated together with the reducing agent, and volatile components are separated from a slag. The reducing agent is a carbonaceous compound.

6 Claims, 2 Drawing Sheets

(51) Int. Cl.
*C22B 1/24* (2006.01)
*C22B 15/00* (2006.01)
*B01D 53/64* (2006.01)
*B01D 53/83* (2006.01)

(52) U.S. Cl.
CPC ................ *C22B 1/24* (2013.01); *C22B 15/00* (2013.01); *C22B 15/0026* (2013.01); *B01D 2251/20* (2013.01); *B01D 2251/204* (2013.01); *B01D 2251/208* (2013.01); *B01D 2251/21* (2013.01); *B01D 2257/60* (2013.01); *C22B 15/0028* (2013.01); *Y02P 10/212* (2015.11)

(56) References Cited

U.S. PATENT DOCUMENTS

| | | | | |
|---|---|---|---|---|
| 4,242,124 | A | * 12/1980 | Makipirtti | C22B 1/00 423/149 |
| 4,740,240 | A | * 4/1988 | Sulzbacher | C21B 13/002 75/623 |
| 6,293,993 | B1 | * 9/2001 | Welter | C22B 1/242 148/553 |
| 6,379,426 | B1 | * 4/2002 | Shonewille | C21B 13/0033 423/148 |

FOREIGN PATENT DOCUMENTS

| | | |
|---|---|---|
| DE | 102011077092 * | 6/2011 |
| DE | 102010011242 A1 | 9/2011 |
| EP | 0285458 A2 | 10/1988 |
| JP | 012807/1974 | 3/1974 |
| JP | 145740/1984 A | 8/1984 |
| JP | 311570/1996 | 11/1996 |
| JP | 2012-052216 A | 3/2012 |
| WO | 91/02824 A1 | 3/1991 |
| WO | 2006/042898 A1 | 4/2006 |
| WO | 2012/080558 A1 | 6/2012 |
| WO | 2013/034049 A1 | 3/2013 |

OTHER PUBLICATIONS

Notification of the Reason for Refusal prepared by the Japanese Patent Office for JP 2016-519341, dated Jan. 31, 2017, 10 pages.

International Search Report prepared by the European Patent Office for PCT/EP2013/070585, dated Jun. 23, 2014, 4 pages.

* cited by examiner

METHOD AND PLANT FOR REMOVING ARSENIC AND/OR ANTIMONY FROM FLUE DUSTS

CROSS-REFERENCE TO RELATED APPLICATIONS

This is a national stage application filed under 35 USC 371 based on International Application No. PCT/EP2013/0705851 filed Oct. 2, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

This invention relates to a method for the treatment of flue dusts containing arsenic and/or antimony from pyrometallurgical methods, wherein a reducing agent is added to the flue dusts, the flue dusts are heated together with the reducing agent, and volatile components are separated. This invention further-more comprises an apparatus for carrying out the method according to the invention.

Copper (Cu), nickel (Ni), zinc (Zn) or similar nonferrous metals are obtained from sulfidic ores. These metals as such represent valuable products which can be processed further in a variety of ways, but must be present in very pure form for this further treatment. This purity is generated by means of pyrometallurgical methods. Pyrometallurgy is understood to be the further thermal treatment of ores or metals obtained already, either by an oxidizing method, i.e. heating with the addition of oxygen, or by a reducing method, i.e. heating in a furnace atmosphere free from oxygen.

Using the example of the smelting of copper ores, a typical pyrometallurgical method will now briefly be described: Concentrates in the form of sulfidic flotation products typically are used as starting substance. These flotation products typically contain copper for about one third, iron for another third, and sulfur for the remaining third. In low concentrations, a plurality of further elements also are contained, above all arsenic (As), antimony (Sb), bismuth (Bi), cadmium (Cd) and lead (Pb). While carrying out the pyrometallurgical method, three phases are obtained, namely the matte, slag and waste gas phases. The waste gas phase not only contains gaseous compounds, but also flue dusts. The distribution of the impurities in the individual phases is obtained by the equilibrium reactions taking place.

The slag phase is obtained in that in a first processing step a part of the iron is separated from the copper concentrate by selective oxidation. At temperatures distinctly above 1000° C., the oxidized iron then is set in the liquid slag phase by adding sand.

The valuable product copper accumulates in the matte phase and in part also above the same in a separate copper slag phase.

Due to the high temperature, impurities, above all arsenic and antimony, are discharged in gaseous form. The waste gas thus loaded with heavy metals subsequently must at least partly be liberated from these impurities in a waste heat boiler and an electric gas cleaning. In the process, particles are formed by re-condensation. Together with entrained particles likewise contained in the waste gas, they form the so-called flue dusts.

Beside the impurities mentioned already, these flue dusts also contain comparatively high amounts of copper (20-30% w/w). For an increase in the process efficiency, the flue dusts themselves must therefore also be supplied to a smelting process, in order to separate the valuable product copper. At the same time, this smelting process must be carried out such that an enrichment of the impurities in the process is avoided.

Such reprocessing of flue dusts is described in DE 10 2010 011 242 A1, according to which these dusts containing arsenic and/or antimony are treated at temperatures between 500 and 1000° C. under an inert atmosphere and by adding sulfur, and a solid phase thus is separated from a gas phase. This gas phase then can be subjected to a further cleaning.

The described method relates to the recirculation of untreated flue dust to the smelter. However, in particular it is difficult to carry out with comparatively high contents of arsenic and/or antimony (2-10% w/w), since the chemical reactions taking place there are equilibrium reactions and thus parts of the contained arsenic and antimony get into the slag. A high content of arsenic and/or antimony in the slag, however, leads to the fact that this slag no longer can be disposed of easily or can even be used as valuable product for road construction, but rather must be disposed of as hazardous waste. If the recirculated flue dust contains 2-10% w/w of arsenic, the impurity collects in the slag phase of the smelter, which creates the described difficulty in slag disposal or slag usage.

BRIEF SUMMARY OF THE INVENTION

Therefore, it is the object of the present invention to provide a method in which the flue dusts can be treated such that the contained valuable products, such as copper, are recovered from the flue dusts, while toxic impurities, above all arsenic and antimony, are reliably removed and the slag obtained in the smelter is suitable for use in road construction.

In this method, a reducing agent is added to the flue dusts and the mixture of flue dusts and reducing agent is jointly heated, whereby volatile components are separated. It is decisive that a carbonaceous compound is added as reducing agent. This method has the advantage that relatively high contents of arsenic and antimony also can be removed without greatly loading the slag. At the same time, the recovery rate of the contained valuable metals is very high, whereby the efficiency of the method can be increased distinctly.

Preferably, the method is carried out in a fluidized bed, since here an optimum mass and heat transport can be ensured.

What is preferred particularly is the use of a circulating fluidized bed, since in the same the temperature difference between the dense phase and the gas zone located above the same, in which particles are present as well, can be kept small. According to the invention, the temperature difference is not more than 20° C., particularly preferably it lies between 0 and 10° C. The small temperature differences ensure that on the one hand the necessary temperature for the removal of arsenic and/or antimony is present everywhere. On the other hand, the melting temperature of other solids is not reached, so that the formation of agglomerates is avoided. Such agglomerates impair the procedure, since they lead to a heterogeneous particle size, whereby in turn it can no longer be ensured that all particles are fluidized in the fluidized bed.

To ensure a reliable operation in particular when using a fluidized-bed method, it furthermore was found to be favorable to first granulate the flue dusts. In general, the flue dusts are present mainly with a diameter of less than 10 μm. In a microgranulation stage, particles with a size of 100 to 500 μm (based on 60 to 100 wt-% of the particles) are produced. Due to this homogenization of the particle size and the simplified procedure due to the larger diameter, the thermal treatment is favored. In a fluidized bed, all particles in addition can equally be fluidized reliably.

It is also favorable to already add the carbonaceous compound acting as reducing agent during the granulation process and/or admix a binder.

The addition of the reducing agent has the advantage that a particularly good mass transport between reducing agent and flue dusts is ensured and mixing effects need not be taken into account during the subsequent heating, above all in the fluidized bed. Therefore, the use of a solid carbonaceous reducing agent, above all coal and/or biomass or the like, is recommendable.

The quality of the granules produced can be improved by the binder, whereby it is ensured that flue dusts are not produced again by particle disintegration, which flue dusts are discharged via the waste gas. In particular in a fluidized-bed method the stability of the particles is decisive, in order to ensure that all particles have a similar residence time in the fluidized bed and arsenic and/or antimony or the like thus is separated reliably.

It has also turned out that the granulation preferably should be carried out at temperatures between 20 and 200° C., preferably 40 and 120° C., since the stability of the granules thus is particularly high.

The method according to the invention can be carried out both in an inert and in a reductive atmosphere.

The use of an inert atmosphere has the advantage that the process conditions can be adjusted particularly well.

The use of a reductive atmosphere in turn leads to the fact that less carbonaceous reducing agent must be used, or at least a part of the carbonaceous reducing agent can be introduced not in solid, but in gaseous form. What is suitable here in particular is the use of carbon monoxide (CO) and/or methane ($CH_4$) or the like as reducing agent.

Preferably, the method according to the invention is carried out at temperatures between 500 and 1.200° C., preferably 750 and 950° C. At these temperatures a high turnover can be ensured, without fusions and as a result agglomeration of the particles.

To increase the process efficiency it has also turned out as favorable when at least part of the heat is recovered after the heating process and is recirculated into the granulation process and/or the heating process. For this purpose, the resulting calcine is cooled. Preferably, cooling is effected to temperatures between 100 and 200° C.

Suitable coolants include both gaseous and liquid coolants. Despite the lower heat transfer coefficient and the lower thermal capacity, the use of a gaseous coolant, in particular air, is recommendable, since this gas can also be used in the heating step, e.g. as preheated fluidizing gas for heating in a fluidized-bed method, whereby here the further input of energy can be lowered and/or this air can be utilized in the microgranulation for temperature adjustment.

The waste gas from the fluid bed furnace, which also contains CO and sulfur compounds, preferably is supplied to a post-combustion stage. The post-combustion is to be carried out such that only small parts of the contained arsenic are oxidized from As(III) to As(V). The resulting energy can be utilized both in the preheating and in an upstream microgranulation.

In addition, solid particles are obtained in this post-combustion, which are recirculated in the microgranulation and/or the heating, so that valuable products still contained therein likewise can be recovered.

The present invention finally also comprises a plant for the treatment of flue dusts containing arsenic and/or antimony from pyrometallurgical methods, which includes an apparatus for adding a carbonaceous reducing agent, a reactor for heating the flue dusts together with the reducing agent, and a separator for separating gaseous and solid components. Furthermore, the plant comprises an apparatus for granulating the flue dusts before introducing the same into the reactor. By means of this granulation it can be ensured that in the downstream treatment of the flue dusts a very high amount of micro-fine particles is not again entrained with the waste gases and the waste gases thus still are loaded.

In addition, the granulation promotes the use of a fluidized-bed reactor, particularly preferably a circulating fluidized-bed reactor.

Further objectives, features, advantages and possible applications of the invention can also be taken from the following description of an exemplary embodiment and the drawings. All features described and/or illustrated form the subject-matter of the invention per se or in any combination, independent of their inclusion in the claims or their back-references.

DETAILED DESCRIPTION OF THE INVENTION

Figure 1:
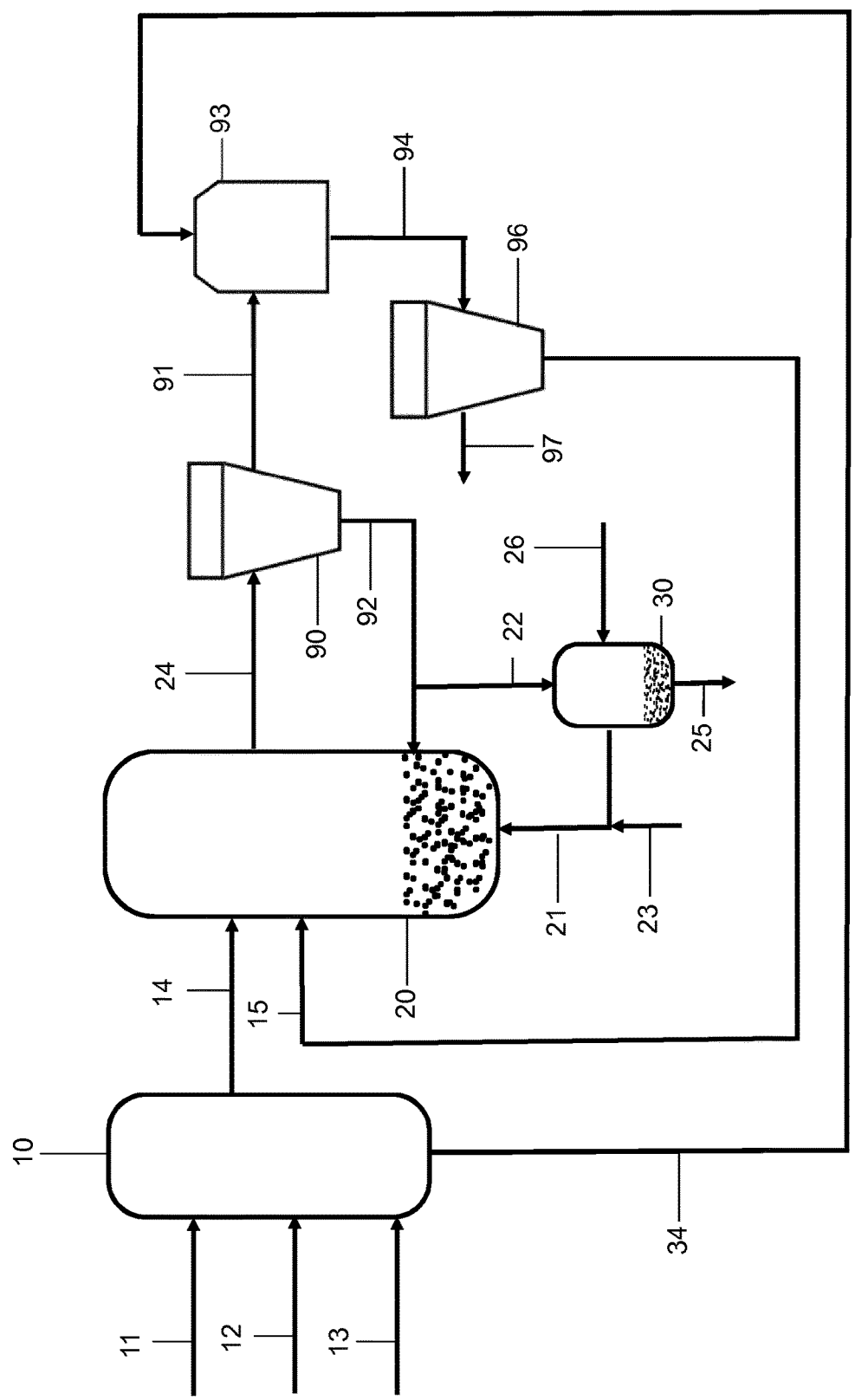
FIG. 1 shows the method according to the invention with a downstream cooling for increasing the energy efficiency, and FIG. 2 schematically shows a representation of the complete waste gas after-treatment.

In FIG. 1, the flue dust containing arsenic and/or antimony is introduced into an apparatus for the microgranulation 10 via conduit 11. Via conduit 12, a carbonaceous reducing agent in solid form, such as coal or biomass, can be added. Via conduit 13, further binders can be supplied to the microgranulation 10. It is of course also possible to realize the supply of several components via a common supply conduit, so that intermixing already is effected in advance.

If no carbonaceous reducing agent is introduced here, this addition must be effected later on.

The particles obtained in the microgranulation 10, of which 60 to 100 wt-% have a diameter of 100 to 500 μm, are introduced into the reactor 20 via conduit 14 and/or into venturi dryer 93 via conduit 34. Via conduit 94, the stream loaded with solids flows into a second separating means 96, e.g. a cyclone. From the second separating means 96 the feed material is conveyed to the reactor via conduit 15. The reactor 20 preferably is designed as circulating fluidized bed. In the reactor 20, the granules are heated to a temperature between 650 and 1000° C., preferably 750 to 950° C. The fluidizing gas is introduced into the reactor via conduit 21. Resulting process gas is discharged via conduit 24.

Via conduit 23, gaseous carbonaceous reducing agent, such as CO and/or methane, can also be introduced. At the same time, it is also possible to introduce a carbonaceous solid material as reducing agent into the reactor 20 via a non-illustrated conduit.

The input of energy for heating into the reactor 20 can be effected in the usual way, in that for example the fluidizing gas at the same time acts as fuel gas, reactant and/or as energy carrier.

Via conduit 24, the solids obtained, namely the calcine, is withdrawn together with at least considerable parts of the waste gas or also the complete waste gas stream and supplied to a first cyclone 90.

In this cyclone 90, the solids of the waste gases and the calcine are at least partly recirculated into the reactor 20 via conduit 92. Part of the solid stream is discharged via conduit 22 into calcine cooler 30 where the heat of the calcine is partially transferred to the fluidizing gas 21. The final product is discharged via conduit 25.

Via conduit 91, the hot waste gas which still is loaded with fine dusts, in particular with particles with a diameter≤50 μm, is supplied to a Venturi drier 93. In the Venturi drier 93, further cooling of the waste gas and a separation of solids and waste gas is effected. Heat contained in the waste gas can be transferred to the microgranulation stage 10 via a non-illustrated heat stream.

Figure 2:
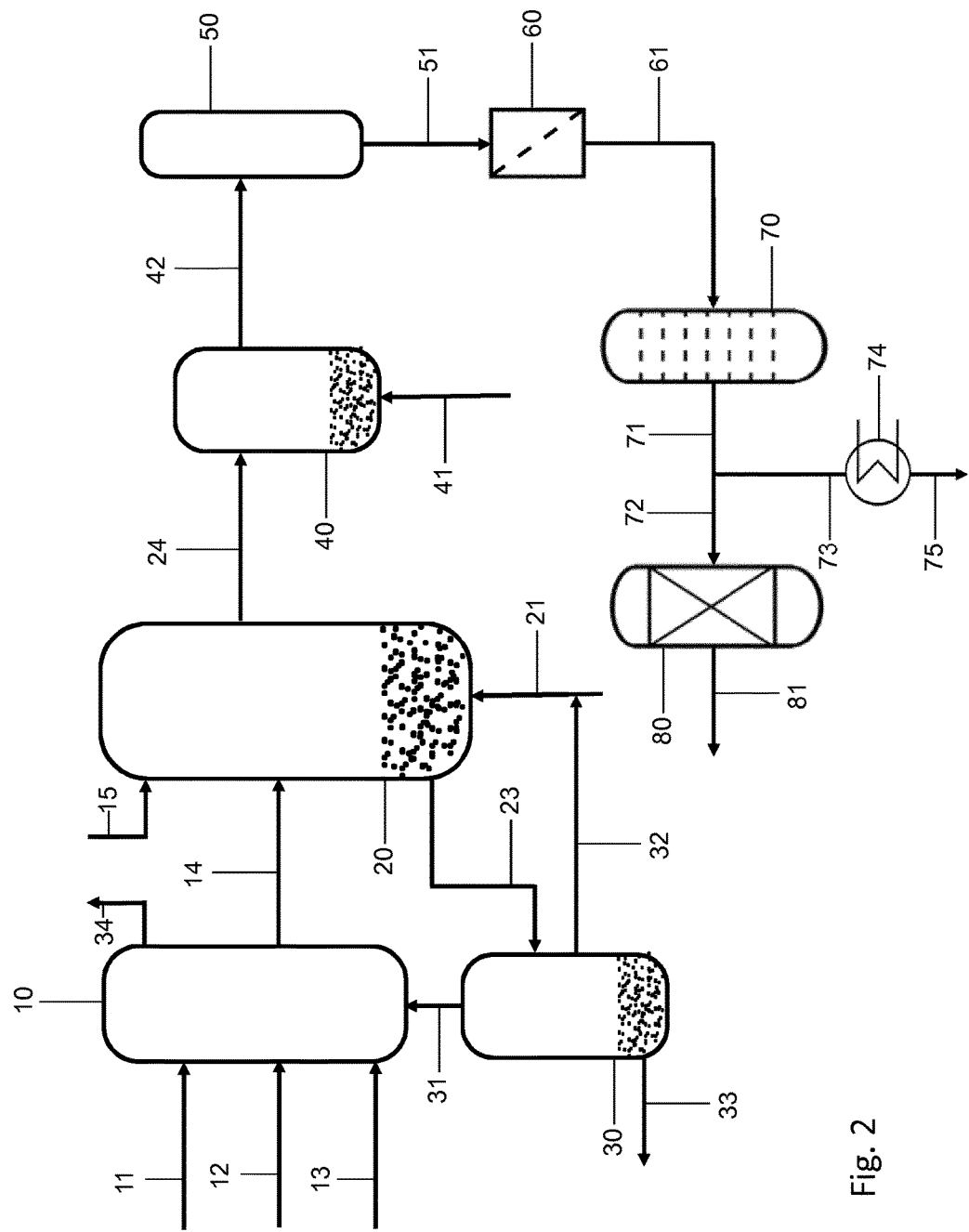

FIG. 2 shows the complete aftertreatment of the resulting waste gas stream together with a corresponding energy concept.

Via conduit 11 the flue dust, via conduit 12 a carbonaceous solid reducing agent, and via conduit 13 further binders (bentonite and/or other anorganic binders, cellulose compounds and/or other organic binders) are introduced into the microgranulation 10. Here as well, a combined supply and/or the omission of the addition of the reducing agent and/or the binder is possible.

After granulating 60 to 100 wt-% of the introduced material to particles with a diameter between 100 and 500 μm, the granules obtained are introduced into the reactor 20 via conduit 14 and/or into the venturi drier 93 via conduit 34 as explained at FIG. 1.

The reactor 20 preferably is designed as a circulating fluidized-bed reactor. Via conduit 24, hot waste gas which also contains fine dust is withdrawn and supplied to a post-combustion 40.

Via conduit 42, most of the waste gases are supplied to a waste gas cooling with a heat recovery system and/or a quench 50. Parts of the recovered heat can be employed elsewhere in the method, e.g. to reduce the energy demand of roasting in the reactor 20. Via conduit 51, the hot waste gas stream which still contains flue dusts is supplied to a hot electrostatic precipitator, for example an electric filter 60. In the same, the fine dusts are separated and for example can be recirculated into the microgranulation 10 in a non-illustrated form. Via conduit 61, the waste gas cleaned and cooled in this way flows into a further, wet gas cleaning 70. In this way, the sulfur compounds contained in the waste gas can be separated and via conduits 71 and 72 finally be supplied to an apparatus for producing sulfuric acid 80, from which sulfuric acid can be withdrawn via conduit 81.

Via conduit 73, parts of the gas stream from the wet gas cleaning 70 are supplied to a heat recovery system 74 and via conduit 75 recirculated into the reactor via a non-illustrated conduit. Due to this recycling loop, the sulfur content in the system is enriched continuously, so that with a corresponding control the downstream plant for producing sulfuric acid can be operated highly profitably in particular with educts with a sulfur content high enough for operation of a sulfuric acid plant (>5 Vol-% $SO_2$).

Finally, parts of the solids, the calcine, can be withdrawn from the reactor 20 after a successful heat treatment and be supplied to a cooling device 30 via conduit 23 and/or from the recirculated stream as explained in FIG. 1 via a non-illustrated conduit. Preferably, the cooling device 30 is designed as fluidized-bed cooler, as it has turned out to be favorable to use the resulting hot gas for pre-heating in the microgranulation 10, to which it is supplied via conduit 31. Correspondingly, the hot gas obtained, preferably hot air, also can be fed into the fluidizing conduit 21 of the reactor 20 via conduit 32.

The cooled calcine is withdrawn from the cooling stage 30 via conduit 33. It can now be fed to the smelter to extract the contained valuable metals as Cu, Ni etc.

LIST OF REFERENCE NUMERALS 10 microgranulation
11-15 conduit
20 reactor
21-26 conduit
30 cooling device
31-34 conduit
40 post-combustion reactor
41, 42 conduit
50 heat recovery means
51 conduit
60 gas-solids separating means
61 conduit
70 wet gas cleaning
71-73 conduit
74 heat exchanger
75 conduit
80 sulfuric acid plant
81 conduit
93 Venturi drier
94-95 conduit
96 cyclone
97 conduit

The invention claimed is:

1. A method for the treatment of flue dusts containing 2 to 10% w/w arsenic and/or antimony from pyrometallurgical methods, wherein a reducing agent is added to the flue dusts, where the flue dusts mainly have a diameter of less than 10 μm, the flue dusts are heated together with the reducing agent in a reductive atmosphere, whereby volatile components are separated, wherein the reducing agent is a carbonaceous compound, characterized in that heating is effected in a fluidized bed, and further characterized in that the flue dusts are granulated before heating with a size of 100 to 500 μm, based on 60 to 100 wt % of the particles, during a microgranulation stage, and used to form the fluidized bed, and further characterized in that the carbonaceous compound is admixed to the flue dusts during granulating.

2. The method according to claim 1, characterized in that in the fluidized bed is a circulating fluidized bed.

3. The method according to claim 1, characterized in that a binder is admixed to the flue dusts during granulating.

4. The method according to claim 1, characterized in that granulating is effected at temperatures between 20 and 200° C.

5. The method according to claim 1, characterized in that heating is effected at temperatures between 500 and 1200° C.

6. The method according to claim 1, characterized in that at least a part of the heat is recovered after heating and supplied to a granulating process and/or the heating.

* * * * *